(12) United States Patent
Hao

(10) Patent No.: US 8,729,765 B2
(45) Date of Patent: May 20, 2014

(54) FIELD COIL FOR AN ELECTRIC MACHINE

(75) Inventor: Lei Hao, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 348 days.

(21) Appl. No.: 13/191,385

(22) Filed: Jul. 26, 2011

(65) Prior Publication Data

US 2013/0026875 A1    Jan. 31, 2013

(51) Int. Cl.
*H02K 1/00* (2006.01)

(52) U.S. Cl.
USPC .......................................... 310/198; 310/179

(58) Field of Classification Search
USPC ...................... 310/179, 198, 261.1, 262, 201
See application file for complete search history.

(56) References Cited

U.S. PATENT DOCUMENTS

| | | | | |
|---|---|---|---|---|
| 3,600,618 | A * | 8/1971 | Nicholas et al. | 310/216.069 |
| 6,956,313 | B2 * | 10/2005 | El-Gabry et al. | 310/179 |
| 2008/0004780 | A1 | 1/2008 | Watanabe et al. | |
| 2010/0193506 | A1 | 8/2010 | Nagai et al. | |

* cited by examiner

*Primary Examiner* — Hanh Nguyen

(57) ABSTRACT

A field coil segment for an electric machine including a rotor and a stator includes a first wire element having a first cross sectional area electrically connected in parallel with a second wire element having a second cross sectional area greater than the first cross sectional area.

21 Claims, 4 Drawing Sheets

FIELD COIL FOR AN ELECTRIC MACHINE

TECHNICAL FIELD

This disclosure is related to field coils for electric machines.

BACKGROUND

The statements in this section merely provide background information related to the present disclosure. Accordingly, such statements are not intended to constitute an admission of prior art.

An electric-powered machine transforms electric power to mechanical torque by inducing rotating magnetic fields with a field coil between a static element, i.e., a stator, and a rotatable element, i.e., a rotor. The rotating magnetic fields impose a torque upon the rotor. The torque is transferred to a shaft coupled to the rotor through conductor bars. The field coil may be associated with the stator.

Known electric-powered machines include a rotor having a stack of steel sheets assembled onto a rotatable shaft, and a plurality of conductor bars fabricated from conductive material, e.g., copper or aluminum. The conductor bars are preferably connected at both axial ends of the rotors using shorting end rings. Known field coils induce current flows through the conductor bars on the rotor that are preferably parallel to an axis of rotation of the rotor.

A known stator includes field coils for carrying a supply current to induce the magnetic field. The quantity of field coils may be varied and are preferably arranged in pairs. The most common types of electric machines are driven with single-phase or three-phase electrical power. A single-phase electric machine requires a starter to begin rotating the rotor as the magnetic field does not rotate. A three-phase electric machine rotates the rotor without a starter by sequentially rotating the magnetic field between the phases of the field coils.

Known field coils are wire-wound or bar-wound. A wire wound field coil is created from bundles of small diameter electrically conductive wires that are inserted into the stator. A bar-wound field coil is created from a series of bars of electrically conductive material that are inserted into the stator.

SUMMARY

A field coil segment for an electric machine including a rotor and a stator includes a first wire element having a first cross sectional area electrically connected in parallel with a second wire element having a second cross sectional area greater than the first cross sectional area.

BRIEF DESCRIPTION OF THE DRAWINGS

One or more embodiments will now be described, by way of example, with reference to the accompanying drawings, in which:

FIGS. 2-1 through 2-6 each illustrates a winding arrangement for a field coil segment, in accordance with the present disclosure;

FIG. 3 illustrates a wiring diagram of field coils having wire elements electrically connected in parallel between a switching circuit and a sink, in accordance with the present disclosure.

FIG. 4 illustrates AC resistance (ohm) in relation to a frequency (Hz) for wire elements in a first arrangement, a second arrangement, a third arrangement, and a fourth arrangement, in accordance with the present disclosure; and FIG. 5 illustrates efficiency as a percentage in relation to frequency (Hz) for wire elements with a first variation, a second variation, and a third variation, in accordance with the present disclosure.

DETAILED DESCRIPTION

Figure 1:
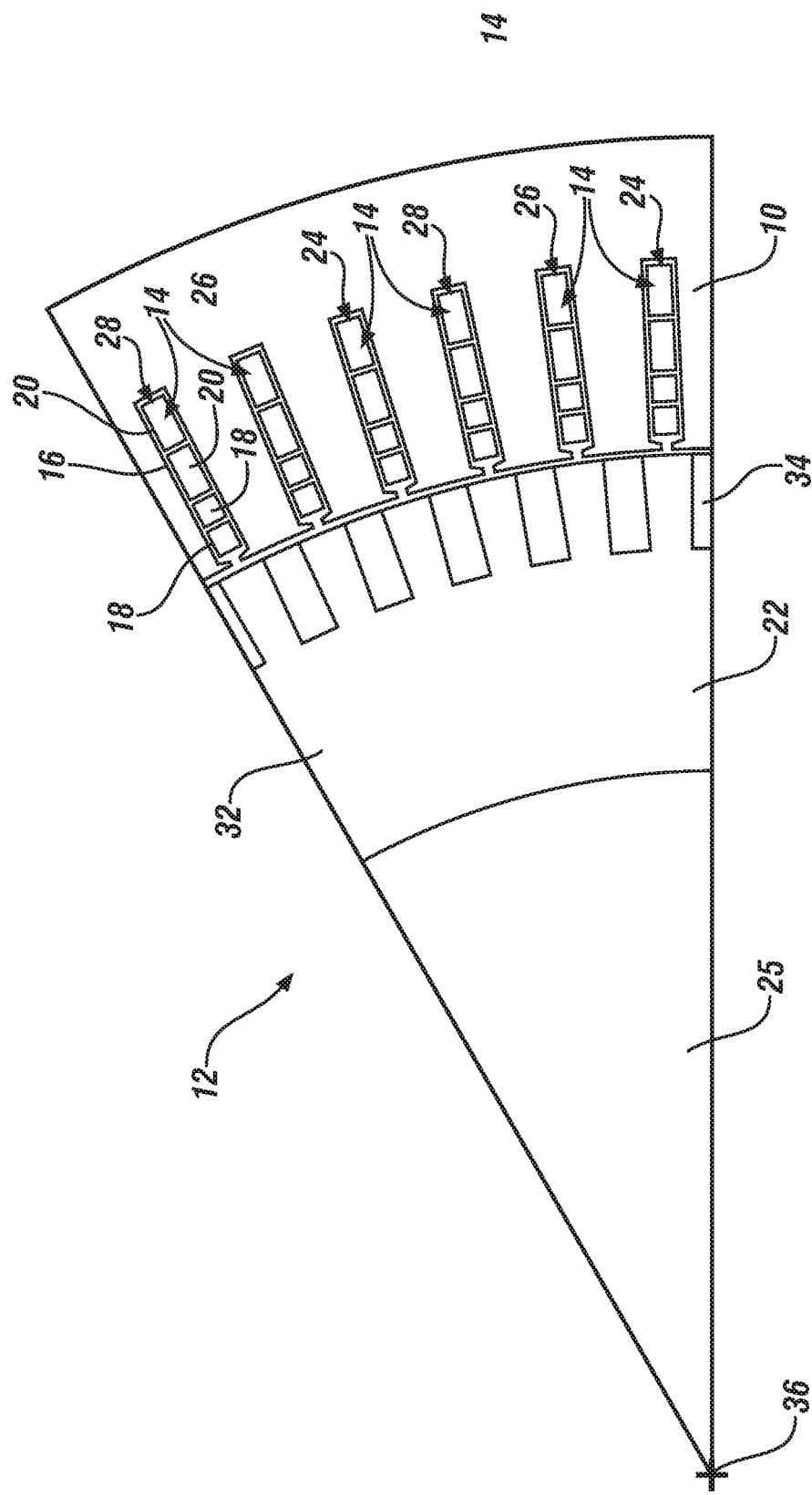
FIG. 1 illustrates a partial section view of a cross-section of an electric machine including a stator and a rotor, in accordance with the present disclosure.

Referring now to the drawings, wherein the showings are for the purpose of illustrating certain exemplary embodiments only and not for the purpose of limiting the same, FIG. 1 illustrates a partial section view through a three-phase electric machine 12 including a stator 10 and a rotor 22. It is appreciated that although three-phase electrical machines are discussed in detail, the disclosure is not so limited and additional phasing schemes may be employed with similar benefits achieved.

The rotor 22 has an axis of rotation 36 about a point that is susceptible to a magnetic field through a series of steel laminate stacked plates 32 and a plurality of conductor bars 34. The rotor 22 is rotatable about the axis of rotation 36 that is concentric with a shaft 25. The stator 10 is an annular device that is concentric to the axis of rotation 36, and includes a plurality of radially oriented slots 16 with respect to the axis of rotation 36, each which is of a shape and size to accommodate an electrically conductive winding referred to herein as a field coil segment 14. The plurality of field coil segments 14 are depicted as elements of the stator 10, but it is appreciated that the concepts described herein apply electric machines employing the field coil segments 14 as elements of a rotor.

Figures 1, 2:
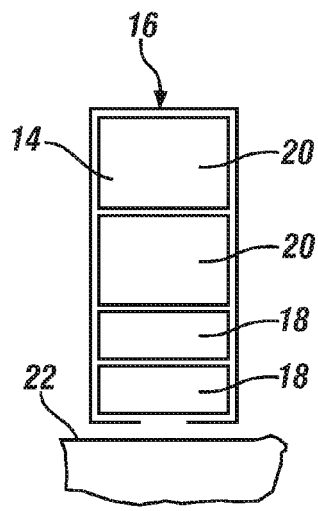
Figure 2:
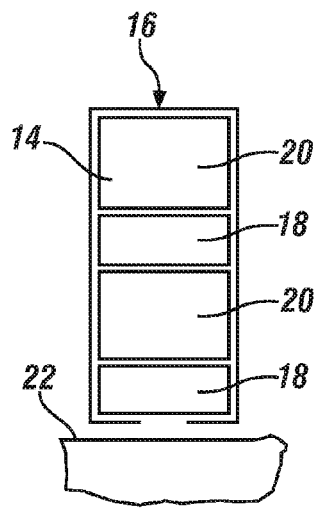
Figures 2, 3:
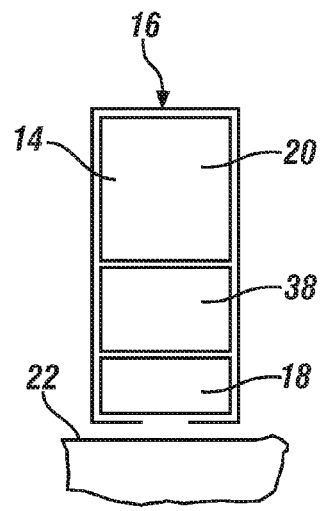

The field coil segments 14 are electrically arranged to form suitable field coils that electrically connect between a switching circuit 30 and a sink 19, shown with reference to FIG. 3. Each phase includes at least a pair of opposing field coils capable of creating a magnetic pole. The phased power may be supplied in single-phase or in multiple phases, with three-phase being a common multi-phase configuration. The single-phase configuration includes a pair of opposing field coils for every magnetic pole and the three-phase configuration includes three pairs of opposing field coils for each magnetic pole. For example, a single-phase single-pole stator has one pair of opposing field coils and a single-phase three-pole stator has three pairs of opposing field coils. Similarly, a three-phase single-pole stator has three pairs of opposing field coils and a three-phase three-pole stator has nine pairs of opposing field coils. Three-phase electrical machines are able to urge rotation in the rotor 22 without a starter device whereas single-phase electrical machines require a starter device.

As shown, the electric machine 12 including stator 10 is arranged to include a set of opposing first-phase field coils 24, a set of opposing second-phase field coils 26, and a set of opposing third-phase field coils 28 sequentially located about a circumference of the stator 10 relative to the axis of rotation 36 in close proximity to and separated from the rotor 22 by an air gap. Each set of the first-phase field coils 24, second-phase field coils 26, and third-phase field coils 28 electrically connects to between a power source and a sink, e.g., a three phase switching circuit and a sink shown with reference to FIG. 3.

Each of the first-phase field coils 24, second-phase field coils 26, and third-phase field coils 28 are formed by electrically connecting selected ones of the field coil segments 14. This includes serially connecting corresponding wire elements for the field coil segments 14 associated with the first-phase field coils 24, serially connecting corresponding wire elements for the field coil segments 14 associated with the second-phase field coils 26, and serially connecting corresponding wire elements for the field coil segments 14 associated with the third-phase field coils 28. Such connections are known and not discussed in detail herein. The serially connected wire elements of each of the first-phase field coils 24, the second-phase field coils 26, and the third-phase field coils 28 are electrically connected in parallel between a power source and a sink.

In the embodiment shown with reference to FIG. 1, each of the field coil segments 14 has two small wire elements 18 and two large wire elements 20. The small wire elements 18 and the large wire elements 20 are arranged in a stack formation relative to radial lines projecting orthogonal to the axis of rotation 36. The small wire element 18 has a cross-sectional area that is less than the cross-sectional area of the large wire element 20. The small wire elements 18 are preferably relatively proximal to the rotor 22 and the axis of rotation 36, and the large wire elements 20 are preferably relatively distal to the rotor 22 and the axis of rotation 36. It is appreciated that the cross-sectional shapes of the small and large wire elements 18, 20, respectively, may be any suitable cross-sectional shape, e.g., round, square, or rectangular. It is appreciated that each cross-sectional area is identified for a plane that is orthogonal to electric current flow. Further, although field coil segments 14 are described as being arranged on a stator 10, the disclosure is not so limited and contemplates field coil segments 14 being arranged on the rotor 22.

FIGS. 2-1 through 2-6 each schematically illustrates a winding arrangement for a single field coil segment 14 inserted into a slot 16 of the rotor 10, with each figure illustrating a different winding arrangement. It is understood that the illustrated field coil segments 14 and associated winding arrangements are not exhaustive but are illustrative of winding arrangements of field coil segments 14 that may be employed.

FIGS. 2-1 through 2-6 each schematically illustrates a winding arrangement for a field coil segment including small wire elements 18, large wire elements 20, and in several of the illustrations, intermediate wire elements 38. It is appreciated that the terms small, large, and intermediate indicate relative dimensions for cross-sectional areas. The winding arrangements for field coil segments shown with reference to FIGS. 2-1 through 2-6 are illustrative. Other winding arrangements for the field coil segments 14 arranged in a radially-oriented stack and inserted into one of the slots 16 using small, intermediate, and large wire elements consistent with the disclosure are contemplated.

FIG. 2-1 schematically shows a first winding arrangement for a single one of the field coil segments 14 inserted into one of the slots 16. The first winding arrangement includes a radially-oriented stack having two adjacent small wire elements 18 proximal to the rotor 22 and two adjacent large wire elements 20 distal to the rotor 22. The two small wire elements 18 and the two large wire elements 20 are electrically connected in parallel between a power source and a sink.

FIG. 2-2 schematically shows a second winding arrangement for a single one of the field coil segments 14 inserted into one of the slots 16. The second winding arrangement includes a radially-oriented stack having two small wire elements 18 and two large wire elements 20 arranged in alternating order with a first one of the small wire elements 18 proximal to the rotor 22, a first one of the large wire elements 20 adjacent thereto, a second one of the small wire elements 18 adjacent to the first one of the large wire elements 20, and a second one of the large wire elements 20 distal to the rotor 22. The two small and two large wire elements 18, 20 are electrically connected in parallel between a power source and a sink.

FIG. 2-3 schematically shows a third winding arrangement for one of the field coil segments 14 inserted into one of the slots 16. The third winding arrangement includes a radially-oriented stack including the small wire element 18, an intermediate wire element 38, and the large wire element 20. The small wire element 18 is proximal to the rotor 22 with the intermediate wire element 38 adjacent thereto, followed by the large wire element 20 distal to the rotor 22. The small, medium, and large wire elements 18, 38, 20, respectively, are electrically connected in parallel between a power source and a sink.

Figures 2, 3, 4:
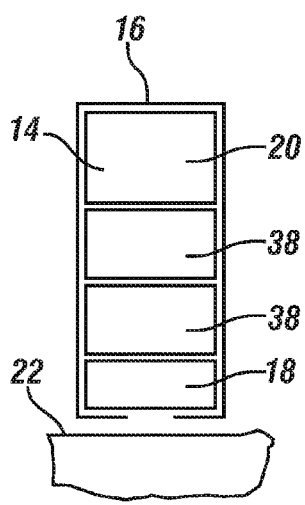

FIG. 2-4 schematically shows a fourth winding arrangement for one of the field coil segments 14 inserted into one of the slots 16. The fourth winding arrangement includes a radially-oriented stack having the small wire element 18 proximal to the rotor 22, followed by two of the intermediate wire elements 38, and the large wire element 20 distal to the rotor 22. The small, medium, and large wire elements 18, 38, 20 are electrically connected in parallel between a power source and a sink.

FIG. 2-5 schematically shows a fifth winding arrangement for one of the field coil segments 14 inserted into one of the slots 16. The fifth winding arrangement includes a radially-oriented stack having two small wire elements 18 arranged side-by-side within the slot proximal to the rotor 22 adjacent to one of two stacked large wire elements 20. The small and large wire elements 18, 20 are electrically connected in parallel between a power source and a sink.

FIG. 2-6 schematically shows a sixth winding arrangement for one of the field coil segments 14 inserted into one of the slots 16. The sixth winding arrangement includes a radially-oriented stack having two small wire elements 18 arranged side-by-side proximal to the rotor 22, with an intermediate wire element 38 adjacent thereto. A large wire element 20 is adjacent to the intermediate wire element 38 and distal to the rotor 22. The small, medium, and large wire elements 18, 38, 20, respectively, are electrically connected in parallel between a power source and a sink.

In each of the winding arrangements depicted with reference to FIGS. 2-1 through 2-6, the corresponding wire elements for the field coil segments 14 associated with each phase are preferably connected in series, and the serially connected wire elements are electrically connected in parallel between a power source and a sink. This is schematically shown in FIG. 3.

FIG. 3 schematically show a wiring diagram of the first-phase field coils 24, second-phase field coils 26, and third-phase field coils 28, each constructed from a plurality of serially-connected field coil segments 14 employing the small wire elements 18 and the large wire elements 20. The small wire elements 18 and the large wire elements 20 of the field coil segments 14 are arranged in one of the aforementioned winding arrangements for a stator of an exemplary three-phase electrical machine 12 that is connected to a power source that includes a switching circuit 30. The small and large wire elements 18, 20 are electrically connected in parallel between the switching circuit 30 and sink 19. The switching circuit 30 passes electrical current through one of the three phases, preferably in sequential order, to create successive magnetic fields in each of the first, second, and third field coils 24, 26, 28. Each of the first, second, and third field coils 24, 26, and 28 includes the small wire elements 18 and large wire elements 20. For example, the switching circuit 30 may be a three-phase switching circuit or inverter that controls the amplitude and frequency of electrical current passing through the first, second, and third field coils 24, 26, and 28, respectively, to create a rotating magnetic field that acts upon a rotor.

The rotor is magnetically susceptible and is urged to rotate about the axis of rotation 36 to align with the magnetic pole when a magnetic pole is created. The electrical current provided by the switching circuit 30 causes the magnetic poles to rotate around the stator 10. The rotation of the magnetic poles causes the rotor to align with the rotating magnetic pole created. The creation of rotating magnetic poles thereby urges the rotor to rotate when the switching circuit 30 sequentially controls electrical current through each of the first, second, and third field coils 24, 26, 28, respectively. Rotational speed of the rotor is controlled by the frequency of the electrical current output from the switching circuit 30.

Each wire element has an internal alternating current (AC) resistance that is affected by a skin effect. The skin effect is the tendency of the electrical current to travel near the surface of a wire element as the frequency increases. A wire element with a larger cross-sectional area in a plane orthogonal to a direction of current flow incurs more skin effect due to a larger surface area than a wire element with a smaller cross-sectional area due to a smaller surface area. The skin effect is discussed in terms of a skin depth, which is the depth of the electrical current traveling from an edge of the wire elements. As the frequency of the current increases, the skin depth decreases as the current attempts to travel near the surface thereby causing higher AC resistance in a wire element. A large wire has little skin effect during low frequency current transfer allowing the skin depth to penetrate the wire resulting in an overall low AC resistance.

Increasing the frequency of the AC current results in increasing the skin effect due to the large surface area of the large wire element, thereby reducing the skin depth and increasing the AC resistance. A smaller wire element has a small skin effect at low frequency with resulting low AC resistance but is unable to transfer as much current as a larger wire due to its smaller cross-sectional area. Increasing the AC current frequency increases the skin effect by a small amount due to the small surface area of the small wire element. The small wire element has a low skin depth loss and a lower increase in AC resistance. Thus, the small wire element carries more current than the larger wire element at higher frequencies.

The effective AC resistance caused by the skin effect is approximated by the following equation:

$$R \approx (L*\rho)/(\pi*(D-\delta)*\delta) \quad [1]$$

wherein L is wire length,

ρ is material resistivity,

D is the wire diameter, and

δ is the effective skin depth.

An analysis using EQ. 1 indicates that AC resistance is affected by larger wire elements at low frequency operation due to skin effect, whereas AC resistance is affected in smaller wire elements at high frequency operation due to skin effect.

FIG. 4 is a data graph plotting AC resistance (ohm) 80 in relation to a frequency (Hz) 90 for wire elements in a first arrangement 82, a second arrangement 84, a third arrangement 86, and a fourth arrangement 88. The first arrangement 82 is a single wire element having a relatively large cross-sectional area. The second arrangement 84 is a single wire element having a relatively small cross-sectional area. The third arrangement 86 is two wire elements having the same cross-sectional area and arranged in a parallel circuit. The fourth arrangement 88 is two wire elements including a first wire having a relatively small cross-sectional area and a second wire having a relatively large cross-sectional area. The first arrangement 82 has a lower AC resistance 80 than the second arrangement 84 at low operating frequencies. The first arrangement 82 has greater AC resistance than either the third arrangement 86 or the fourth arrangement 88 at low operating frequencies. As indicated, the AC resistance of the first arrangement 82 increases to be greater than the second arrangement 84 at approximately 470 Hz, and has the greatest AC resistance of all the arrangements at higher frequencies up to at least 1200 Hz.

The third arrangement 86 and the fourth arrangement 88 have approximately the same AC resistance at low operating frequencies, and begin diverging at approximately 200 Hz. The AC resistance of the third arrangement 86 increases in relation to the AC resistance of the fourth arrangement 88. The AC resistance of the third arrangement 86 is less than the AC resistance of the second arrangement 84 at lower frequencies, is equal thereto at approximately 980 Hz and is greater than the AC resistance of the second arrangement 84 thereafter. The AC resistance of the fourth arrangement 88 is the least across the reported frequency range, i.e., 0-1200 Hz. Therefore, the graph indicates no loss of performance at a low frequency range and the best performance at higher frequency ranges for the fourth arrangement 88, which includes two wire elements including a first wire having a relatively small cross-sectional area and a second wire having a relatively large cross-sectional area.

Table 1 provides an AC resistance reduction relationship for electric machines configured in the third arrangement 86 (Resistance Same Size Wire) and the fourth arrangement 88 (Resistance Different Size Wire) across the frequency range between 0 Hz and 1200 Hz.

TABLE 1

| Frequency (Hz) | Resistance Different Size Wire | Resistance Same Size Wire | Resistance Ratio | Loss Reduction at Peak Torque (W) |
|---|---|---|---|---|
| 0 | 0.0025 | 0.0025 | 1.00 | 0 |
| 100 | 0.0026 | 0.0026 | 1.00 | 0 |
| 200 | 0.0029 | 0.0030 | 0.97 | −55.87 |
| 300 | 0.0034 | 0.0037 | 0.91 | −214.02 |
| 400 | 0.0039 | 0.0047 | 0.84 | −318.27 |
| 500 | 0.0046 | 0.0059 | 0.78 | −453.40 |
| 600 | 0.0054 | 0.0074 | 0.73 | −595.42 |
| 700 | 0.0063 | 0.0092 | 0.68 | −783.50 |
| 800 | 0.0072 | 0.0111 | 0.65 | −963.79 |
| 900 | 0.0082 | 0.0133 | 0.62 | −1142.60 |
| 1000 | 0.0093 | 0.0156 | 0.59 | −1393.60 |
| 1100 | 0.0104 | 0.0181 | 0.58 | −1622.60 |
| 1200 | 0.0116 | 0.0207 | 0.56 | −1765.99 |

The AC resistance of the fourth arrangement 88 and the AC resistance of the third arrangement 86 are shown for each operational frequency listed. An AC resistance ratio (Resistance Ratio) is calculated, and is a ratio of the resistance of the third arrangement 86 relative to the fourth arrangement 88 at each frequency. A power loss reduction (Loss Reduction at Peak Torque (W)) is determined, and is a calculated reduction in power between operating with the third arrangement 86 relative to the fourth arrangement 88 due to the change in resistance at different frequencies. Each power loss reduction has a negative value, indicating an increase in power when operating with the fourth arrangement 88 relative to the third arrangement 86. The large wire element of the fourth arrangement 88 is dominant at low frequencies, approximately 0 to 200 Hz, as the AC resistance is similar between the third arrangement 86 and the fourth arrangement 88. As the frequency increases from approximately 200 Hz, the skin effect becomes more pronounced for the large wire element of the third arrangement 86 relative to the fourth arrangement 88. However, the skin effect is less on the small wire element of the fourth arrangement 88, and thus the small wire element transfers current more efficiently. The skin effect is particularly pronounced as the frequency increases, as may be seen by the AC resistance ratio at 1200 Hz of 0.56 and a loss reduction at peak torque of −1765.99 W.

Figures 2, 3, 4, 5:
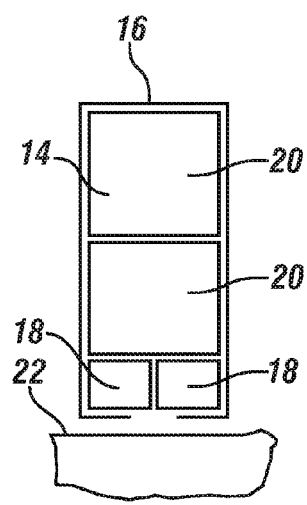
Figures 2, 3, 4, 5, 6:
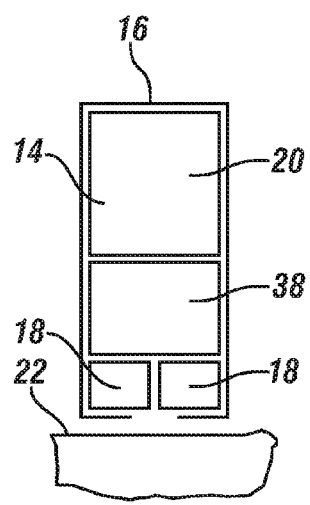
Figure 3:
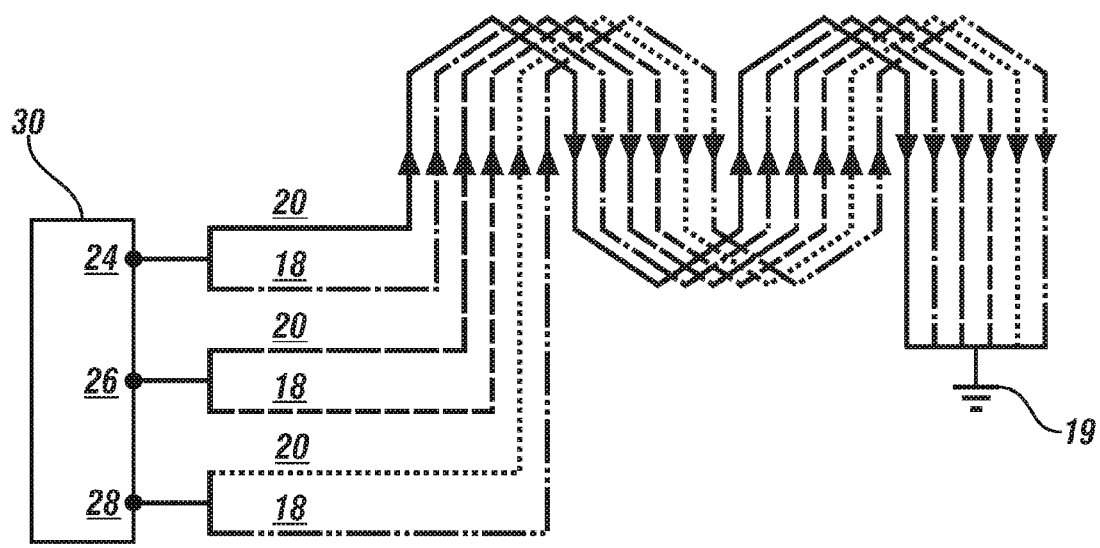
Figure 4:
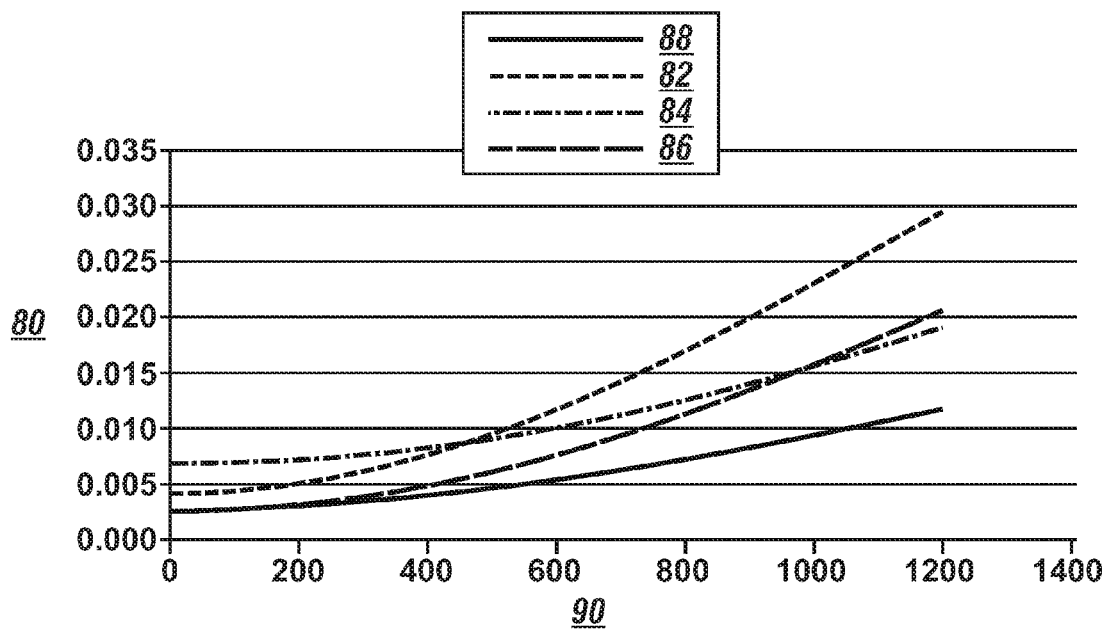
Figure 5:
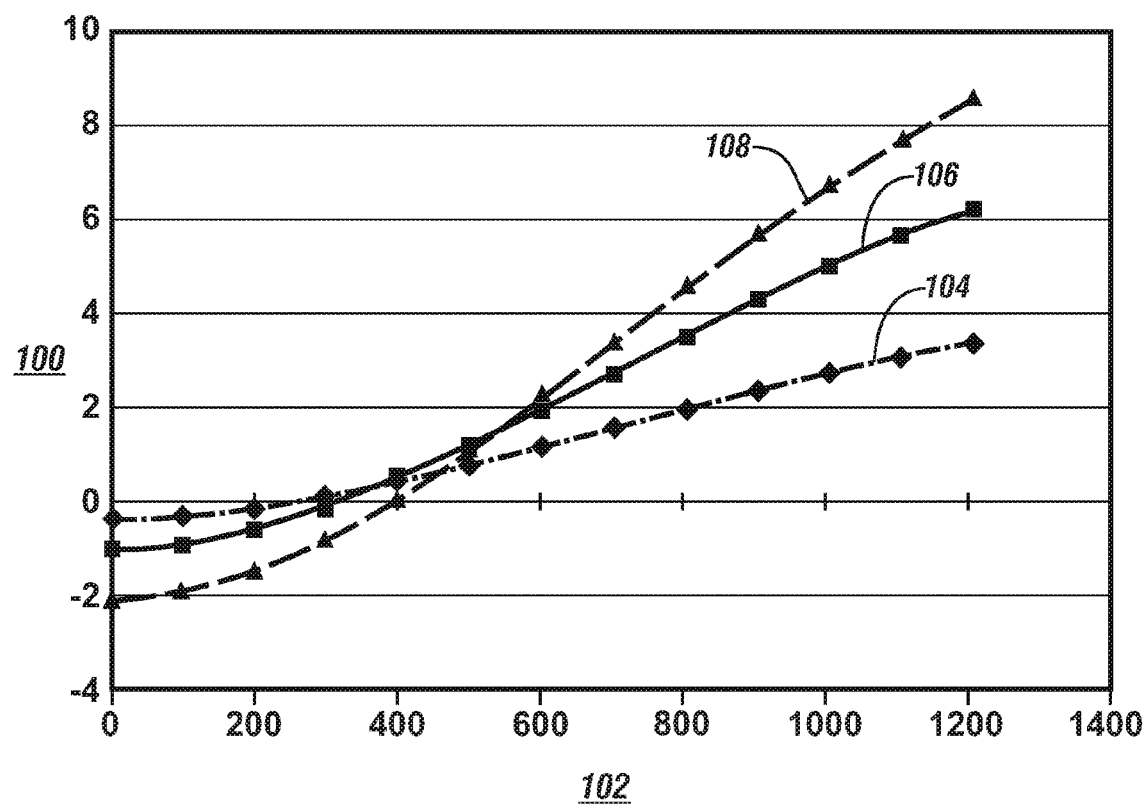

FIG. 5 is a data graph plotting efficiency (%) 100 on the vertical axis in relation to a frequency (Hz) 102 on the horizontal axis for an exemplary electric machine configured with field coil segments 14 arranged as described with reference to FIG. 2-1, with two smaller wire elements proximal to a rotor and two larger wire elements distal from the rotor.

The depicted data includes a first variation 104, a second variation 106, and a third variation 108, each which is compared to a base field coil segment having uniform sized wire elements. Each of the first variation 104, second variation 106, and third variation 108 are based upon a percentage decrease and increase to create smaller and larger wire cross-sections, respectively while maintaining the same overall amount of material for a field coil segment. For the particular example, the smaller wire cross-section is associated with the small wire elements and the larger wire cross-section is associated with the large wire elements described herein.

The first variation 104 includes the cross-sectional area of the small wire element reduced by 4.5%, and the cross-sectional area of the large wire element increased by 4.5%. Below approximately 300 Hz, a reduction in efficiency occurs over the base field coil segment, i.e., approximately −0.5% at 0.0 Hz. At high frequency, i.e., above approximately 300 Hz, a steadily increasing advantage is shown to 1200 Hz at which point there is a 3.0% efficiency increase.

The second variation 106 includes the cross-sectional area of the small wire element reduced by 9.0%, and the cross-sectional area of the large wire element increased by 9.0%. Below approximately 300 Hz, a reduction in efficiency occurs over the base field coil segment, i.e., approximately −1.0% at 0.0 Hz. At high frequency, i.e., above approximately 300 Hz, a steadily increasing advantage is shown to 1200 Hz at which point there is a 6.0% efficiency increase.

The third variation 108 includes the cross-sectional area of the small wire element reduced by 13.5%, and the cross-sectional area of the large wire element increased by 13.5%. Below approximately 400 Hz, a reduction in efficiency occurs over the base field coil segment, i.e., approximately −2.0% at 0.0 Hz. At high frequency, i.e., above approximately 400 Hz, a steadily increasing advantage is shown to 1200 Hz at which point an 8.0% efficiency increase is realized.

It will be apparent that the size variation and benefits achieved thereby is not limited to the specific examples illustrated. It will be further understood the variations illustrated may be used to select appropriate field coil segment sizes for a specific application. For example, if an electric machine is expected to operate at speeds that are predominantly greater than 800 Hz, the third variation or a larger cross-sectional difference may be selected. However, if an electric machine is expected to operate at speeds that are predominantly between approximately 300 Hz and 600 Hz, either the first variation or the second variation may be selected.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A field coil segment for an electric machine including a rotor and a stator, comprising:
a first wire element having a first cross sectional area electrically connected in parallel with a second wire element having a second cross sectional area greater than the first cross sectional area.

2. The field coil segment of claim 1, wherein the wire elements are arranged in a radially-oriented stack inserted into a slot formed on the stator of the electric machine.

3. The field coil segment of claim 2, wherein the first wire element is closer to the rotor of the electric machine relative to the second wire element.

4. The field coil segment of claim 1, further comprising a third wire element having a third cross sectional area intermediate the first and second cross sectional areas, said third wire element electrically connected in parallel with the first and second wire elements.

5. The field coil segment of claim 4, wherein the wire elements are arranged in a radially-oriented stack inserted into a slot formed on the stator of the electric machine.

6. The field coil segment of claim 5, wherein the first wire element is closer to the rotor of the electric machine relative to the second and third wire elements, and the third wire element is closer to the rotor of the electric machine relative to the second wire element.

7. The field coil segment of claim 1, further comprising a third wire element having the first cross sectional area and a fourth wire element having the second cross sectional area, said third and fourth wire elements electrically connected in parallel with the first and second wire elements.

8. The field coil segment of claim 7, wherein the wire elements are arranged in a radially-oriented stack inserted into a slot formed on the stator of the electric machine.

9. The field coil segment of claim 8, wherein the first and third wire elements are closer to the rotor of the electric machine relative to the second and fourth wire elements.

10. The field coil segment of claim 8, wherein the first wire element is closer to the rotor of the electric machine relative to the second, third and fourth wire elements, the third wire element is closer to the rotor of the electric machine relative to the second and fourth wire elements, and the second wire element is closer to the rotor of the electric machine relative to the fourth wire element.

11. The field coil segment of claim 8, wherein the first wire element is closer to the rotor of the electric machine relative to the second, third and fourth wire elements, the second wire element is closer to the rotor of the electric machine relative to the third and fourth wire elements, and the third wire element is closer to the rotor of the electric machine relative to the fourth wire element.

12. The field coil segment of claim 8, wherein the first and third wire elements are side-by-side within the slot and closer to the rotor of the electric machine relative to the second and fourth wire elements.

13. The field coil segment of claim 1, further comprising a third wire element having the first cross sectional area and a fourth wire element having a third cross sectional area intermediate the first and second cross sectional areas, said third and fourth wire elements electrically connected in parallel with the first and second wire elements.

14. The field coil segment of claim 13, wherein the first and third wire elements are side-by-side within the slot and closer to the rotor of the electric machine relative to the second and fourth wire elements, and the fourth wire element is closer to the rotor of the electric machine relative to the second wire element.

15. The field coil segment of claim 1, further comprising a third wire element having a third cross sectional area intermediate the first and second cross sectional areas, and a fourth wire element having the third cross sectional area, said third and fourth wire elements electrically connected in parallel with the first and second wire elements.

16. The field coil segment of claim 15, wherein the wire elements are arranged in a radially-oriented stack inserted into a slot formed on the stator of the electric machine.

17. The field coil segment of claim 16, wherein the first wire element is closer to the rotor of the electric machine relative to the second, third and fourth wire elements, the third wire element is closer to the rotor of the electric machine relative to the second and fourth wire elements, and the fourth wire element is closer to the rotor of the electric machine relative to the second wire element.

18. A field coil for a phase of an electric machine including a rotor and a stator, comprising:

a plurality of field coil segments each including respective first wire elements having a first cross sectional area and respective second wire elements having a second cross sectional area greater than the first cross sectional area;

said respective first wire elements serially electrically connected between a power source and a sink; and said respective second wire elements serially electrically connected between the power source and the sink.

19. The field coil of claim 18, wherein the respective wire elements are arranged in radially-oriented stacks inserted into respective slots formed on the stator of the electric machine.

20. The field coil of claim 19, wherein respective first wire elements are closer to the rotor of the electric machine relative to the respective second wire elements.

21. The field coil of claim 20, wherein the a plurality of field coil segments each further includes respective third wire elements having a third cross sectional area intermediate the first and second cross sectional areas, said respective third wire elements serially electrically connected between the power source and sink, and said third wire elements located intermediate the first and second wire elements.

* * * * *